Patented June 10, 1947

2,422,171

UNITED STATES PATENT OFFICE 2,422,171

METHODS OF PRODUCING ARYL COMPOUNDS

Kenneth W. Saunders, Stamford, Conn., assignor to American Cyanamid Company, New York, N. Y., a corporation of Maine No Drawing. Application August 21, 1945, Serial No. 611,919

11 Claims. (Cl. 260—668)

This invention relates to the production of aryl compounds having at least one aliphatic nuclear substituent which contains a carbon-to-carbon double bond, and more particularly, to the production of such aryl compounds as those which have a vinyl group attached to an aryl nucleus.

The patent of Murray Gray Sturrock and Thomas Lawe, No. 2,373,982 which issued April 17, 1945, discloses a method of producing styrenes and other aryl compounds made in accordance with the present invention, and this patent deals with the use of siliceous catalysts, and more particularly, hydrated aluminum silicate catalysts.

An object of the present invention is to provide improved catalysts which are effective for the conversion of diaryl substituted paraffins, having at least two carbon atoms in the paraffin chain and having the aryl groups attached to the same carbon atom, into two aromatic compounds, including one which has an aliphatic nuclear substituent containing a carbon-to-carbon double bond.

These and other objects are attained by employing a natural clay comprising magnesium, aluminum and silicate as a catalyst for the aforementioned type of reaction. Clays suitable for use in accordance with the present invention are described by Kerr, American Mineralogist, vol. 22, page 534 (1937). Among the suitable clays there are those from Attapulgus, Georgia, and those from Monmorillon. More specifically, the present process contemplates contacting a vapor comprising a compound of the class consisting of paraffins, having at least two carbon atoms and having two aryl substituents attached to one of said carbon atoms and their nuclear substituted derivatives with a magnesia-alumina-silica catalyst such as Attapulgus clay at a temperature of at least 350° C. and preferably at a temperature of 500–600° C. It is preferable that the contact time be less than 0.4 second, and in order to avoid practical difficulties it is generally desirable to employ a contact time of 0.001 second or more. Still another feature of the present process is the use of a diluent, preferably water vapor in relatively high proportions, namely, from 5 to 150 or more mols of diluent per mol of the ditolyl substituted paraffin. Water vapor is one of the most desirable diluents since it may be easily condensed and thereby separated from the final product. The following example in which the proportions are in part by weight is given by way of illustration and not in limitation. The diotoylethane employed in the following example is 1,1-di-p-tolylethane.

Example

About 330 parts of Attapulgus clay catalyst are packed into a tube heated and maintained at a temperature of about 482°–520° C. Ditolylethane is passed through the tube at the rate of about 3470 parts per hour and water vapor is mixed therewith, passed through the tube at the rate of about 2930 parts per hour. The contact time employed is 0.1 second. A total of about 1360 parts of ditolylethane is passed through the tube and about 1330 parts of hydrocarbon condensate are recovered. This is distilled to yield about 840 parts of a light oil boiling below 200° C., 400 parts of hydrocarbons boiling at about the boiling point of the ditolylethane and containing the unchanged ditolylethane together with small quantities of other substances such as an asymmetric ditolylethylene, leaving about 80 parts of a high boiling residue and leaving a distillation loss of about 10 parts of material.

The light oil is titrated with a potassium bromide-bromate solution and the proportion of methylstyrene in the light oil is calculated from the results of this titration (assuming that the unsaturated content is all p-methylstyrene). Since it is theoretically possible to have only about 56.2% of p-methylstyrene in the light oil the percentage of p-methylstyrene found by the above analysis when subtracted from 56.2 gives the percentage of p-ethyl toluene in the light oil. The remainder of the light oil is assumed to be toluene. The foregoing method of analysis and calculations have been found to be accurate when checked by the results obtained by fractionation of the light oil, by infra-red and other spectroscopic analysis thereof. The use of the foregoing method of analysis shows the light oil obtained in accordance with this example contains about 352 parts of p-methylstyrene, 84 parts of p-ethyl toluene and 404 parts of toluene.

The Attapulgus clay employed in the foregoing examples contains about 10% $Al_2O_3$, about 9.1% MgO, about 53% $SiO_2$ and about 20% $H_2O$. Other clays from Attapulgus or Monmorillon in France may be used in place of the Attapulgus clay used in the foregoing examples. Furthermore, other clays of the same type, that is to say, clays containing aluminum, magnesium and silica in substantial proportions may be employed as catalysts in accordance with this invention. To be suitable for use in accordance with my invention the clay should contain at least 1% of MgO and the clay should preferably contain at least 5% of MgO. Similarly, the clay should contain at least 1% and preferably at least 5% of $Al_2O_3$. While the natural clays of the type employed in accordance with this invention are believed to be hydrous magnesium aluminum silicates it is to be understood that I am not to be limited to the use of true silicates.

The natural clays are preferably heated to a temperature of about 150–700° C., before they are employed as catalysts in accordance with my invention.

In addition to the natural clays containing magnesium which are suitable for use in accordance with this invention I may also employ synthetic hydrated magnesium aluminum silicates. Such silicates may be true silicates or they may be intimate mixtures of magnesia-alumina and silica. They may be prepared by the coprecipitation of alumina, magnesia and silica to form a hydrogel which is thereafter washed and dried. Still another method of preparation is to precipitate magnesia on an aluminum silicate, or to precipitate alumina on a magnesium silicate. Furthermore, the alumina or magnesia may be precipitated simultaneously, or in separate steps on a silica hydrogel. After the gels are prepared they are preferably calcined after drying for example, at a temperature of about 150–700° C., or more.

My catalysts may include other heat resistant and solid substances which activate them or which are entirely inert, and such substances may be used to extend the active surface of the magnesia-alumina-silica catalyst or they may be used as supports for the catalysts. For example, my catalysts may be supported upon finely divided silicon carbide, non-porous aluminum oxide (such as those materials sold under the trade names 'Alfrax," "Alundum," etc.), highly fired ceramic materials in the form of rings, saddles and the like. Binding agents such as sodium silicate may be advantageously employed in some cases to improve the mechanical stability of my catalysts.

My catalysts are employed in a finely divided condition fashioned into pellets which are preferably no larger than about 5 mms. in their greatest diameter. The pellets may be in any desired shape such as cubical, spherical, or of an irregular granular shape. When large pellets are employed the vapor velocity varies widely between the center and outside of the pellet, and therefore the contact time at the center of the pellet is longer than desirable. It is preferable that the particles be as fine as possible in order to reduce the difference between the maximum and minimum vapor velocities which occur in the catalyst bed. Obviously the particle size should not be so small that the catalyst packs thereby causing the vapors to channel through the catalyst instead of passing therethrough in a uniform manner.

The converter into which the catalyst is packed may be a tube constructed of steel, silica or any other suitable material and in large scale operations the converter may comprise a plurality of such tubes or it may be a shell-type converter having one or more layers or trays of catalyst therein.

A short contact time of the diaryl paraffin with the catalyst is desirable in carrying out the reactions in accordance with this invention. While longer contact times may be used if desired it is generally preferable that the contact time be less than 0.4 second. The contact times between about 0.1 and 0.05 are especially suitable. Generally it is desirable to employ a contact time of 0.001 second or longer, in order to avoid practical difficulties. The calculation of the contact of the vapor with the catalyst is a complex matter, and in order to simplify this calculation I have used the term "contact time" herein to mean those values which are computed on the assumption that the catalyst contains 50% voids and neglecting both the pressure drop through the catalyst and the increase in volume which occurs during the reaction.

Inasmuch as the reaction is neither highly exothermic nor endothermic it is not necessary to supply much more heat than that necessary to compensate for conduction and radiation losses in order to maintain the reaction temperature of the vapors passing through the catalyst, providing that the vapors which are fed to the catalyst are preheated to about the desired reaction temperature and providing a high ratio of diluent to the daryl paraffin is employed. I therefore prefer that the vapors fed to the catalyst be preheated to the reaction temperature. Any suitable method of heating the converter may be employed such as, for example electrical resistance heaters.

The following are illustrative of the aliphatic compounds having two aryl substituents attached to the same carbon atom thereof which may be converted into the mononuclear aromatic compounds in accordance with the present invention: 1,1-diphenylethane, each of the 1-phenyl-1-tolylethanes, each of the 1,1-ditolylethanes, each of the 1-phenyl-1-xylylethanes, each of the 1-tolyl-1-xylylethanes, each of the 1,1-dixylylethanes, 1,1-diphenylpropane, each of the 1-phenyl-1-tolylpropanes, each of the 1,1-ditolylpropanes, each of the 1-tolyl-1-xylylpropanes, each of the 2,2-ditolylpropanes, each of the 1,1-di-(monochlorophenyl)-ethanes, each of the 1,1-di-(dichlorophenyl)-ethanes, each of the 1,1-di-(monohydroxy phenyl)-ethanes, each of the 1,1-dicresylethanes, each of the 2,2-dicresylpropanes, each of the 1,1-dinaphthylethanes, each of the 1,1-dixenylethanes, each of the 1-tolyl-1-naphthylethanes, and the like and their nuclear substituted halogen, hydroxyl and other derivatives all of which are volatile at the temperature and pressure used in the process. Those substances containing tolyl, xylyl, cresyl, xenyl, monochlorophenyl and dichlorophenyl groups may be attached to the carbon atom of the paraffin chain at the ortho, meta or para positions and when two of these groups are present they may be attached in the same or different positions.

The reaction temperature may be varied from about 350° C., up to about 600° C. or even higher in some cases. Temperatures above 600° C. cause some pyrolysis loss but on the other hand some of the diaryl paraffins are not easily decomposed at lower temperatures. It is particularly important to employ a short time of contact when temperatures in the neighborhood of 600° C. are used in order to avoid an undesired amount of pyrolysis loss due to side-reactions. Among such side-reactions are those which lead to the formation of polynuclear compounds including anthracene derivatives.

One of the advantages of employing a short contact time with catalysts is that the life thereof is prolonged. With contact times of the order of 1 second or more the catalyst may become fouled in a relatively short period of time due to the deposition of carbonaceous materials on the surface of the catalyst. When it is necessary or desirable to reactivate the catalyst this may be done by passing heated air, preferably mixed with steam or carbon dioxide, through the catalyst. The temperature of the air and steam mixture should be raised to about 500°–650° C. The air enables the carbon to burn whereas the steam or carbon dioxide which is used in conjunction with the air keeps the temperature from rising too high which might cause a reduction in the activity in the catalyst. Generally, at temperatures of about 500° C., the carbon begins to burn off and the heat of this reaction causes the temperature to rise to about 650° C., without the application of any external heat.

It may be seen that the proximity of the reactivation temperature to the reaction temperature greatly simplifies the change from normal operation to reactivation and back to normal operation. Since the normal highly active life of the catalyst exceeds the time required for its reactivation the operation of two or more converters in parallel is readily accomplished. The short time of reactivation enables one to keep one or more converters in normal operation while one or more other converters are being reactivated.

Any material which is volatile and which does not react with the diaryl substituted paraffin which is to be used in accordance with my process and which does not react with the products formed by the decomposition of the diaryl substituted paraffin may be used as a diluent. Among these, some examples are: water, the hydrocarbons (such as benzene and toluene), the fixed gases (such as nitrogen and carbon dioxide), etc. Water vapor is the preferred diluent inasmuch as it may be readily condensed and therefore separated from the products of the reaction, whereas the fixed gases or the hydrocarbons are somewhat more difficult to separate from the product and such separation requires higher expenditures than are required for the separation of water from the product. Water vapor also has an additional advantage in that it may maintain the catalyst in highly active form.

One of the most important reasons for the use of a diluent is that the time of contact of the diaryl substituted paraffin with the catalyst can be reduced to the desired point easily. It has been found that in order to obtain the short contact times which are desirable in accordance with the present invention the molal ratio of diluent to the diaryl substituted aliphatic compound in the feed to the catalyst is preferably between about 5:1 and 150:1, or more. If the feed can be supplied rapidly enough to provide a low contact time without the use of the large proportion of diluent the ratio of diluent to the diaryl substituted paraffin may be as low as 1:2.

It has been found that it is frequently desirable to convert only a few percent of the diaryl substituted paraffin fed to the catalyst in one pass but by recovering the unconverted diaryl substituted paraffin and recirculating it from one to five times or more, a high yield is obtained very economically.

Our process may be operated at elevated or reduced pressure and under some conditions it may be particularly advantageous to operate under reduced pressure. If the diaryl substituted paraffin which is to be used in accordance with present processes is not readily volatile at ordinary pressure, reduced pressures may be used to facilitate the operation of our process.

The present process is a convenient and economical method of converting the diaryl substituted paraffins, having at least two carbon atoms in the paraffin chain and having the two aryl groups attached to the same carbon atom, into two aromatic compounds, one of which contains a side chain having an ethylenic group. The vinyl substituted aryl compounds prepared in accordance with the present invention have wide utility in the production of polymers which in turn are useful for molding, casting, laminating and for many other purposes. Furthermore, pure aryl compounds such as xylene in extremely high purity may be produced simultaneously with the production of the aromatic compound containing an ethylenic side chain. Thus when a diaryl substituted paraffin is cracked in accordance with this invention one molecule of an aryl compound having an ethylenic side chain is obtained together with one molecule of a pure aryl compound which does not have an ethylenic side chain. Such pure aryl compounds, as for example pure m-xylene or pure p-xylene, find utility in the synthesis organic compounds where the presence of one or more of the possible isomers is undesired.

I claim:

1. A process of producing a plurality of aromatic compounds which comprises heating a paraffin having at least two carbon atoms and having two aryl substituents attached to one of said carbon atoms at a temperature which will cause said paraffin to decompose into a plurality of aromatic compounds in the presence of a catalyst and which is at least 350° C., in the presence of a magnesia-alumina-silica catalyst.

2. A process of producing a plurality of aromatic compounds which comprises contacting a substance selected from the class consisting of paraffins having at least two carbon atoms in the paraffin chain and having two aryl substituents attached to one carbon atom thereof, and their nuclear substituted derivatives at a temperature which will cause said paraffin to decompose into a plurality of aromatic compounds in the presence of a catalyst and which is at least 350° C., with Attapulgus clay.

3. A process of producing a plurality of aromatic compounds which comprises mixing a substance selected from the class consisting of diaryl substituted paraffins having at least two carbon atoms in the paraffin chain and in which both aryl groups are attached to the same carbon atom and their nuclear substituted derivatives with a diluent contacting the resulting mixture thereof with a magnesia-silica-alumina catalyst and maintaining the temperature of said mixture at a temperature which will cause said paraffin to decompose into a plurality of aromatic compounds in the presence of a catalyst and which is at least 350° C., during the time it is in contact with said catalyst.

4. A process as in claim 3 wherein the diaryl substituted paraffin has an asymmetric diarylethane and where the time of contact thereof with the catalyst is between about 0.001 second and about 0.4 second.

5. A process as in claim 3 wherein the diluent is water vapor.

6. In a method of producing a plurality of aromatic compounds the steps of which comprise heating a substance of the class consisting of diaryl substituted paraffins having at least two carbon atoms in the paraffin chain and having both aryl groups attached to one of the carbon atoms, and their nuclear substituted derivatives, to a temperature which will cause said paraffin to decompose into a plurality of aromatic compounds in the presence of a catalyst and which is at least 350° C., passing said substance through Attapulgus clay with a contact time of less than 0.4 second.

7. In a method of producing a plurality of aromatic compounds the step which comprises contacting an asymmetric ditolylethane with an Attapulgus clay catalyst at a temperature which will cause said paraffin to decompose into a plurality of aromatic compounds in the presence of a catalyst and which is at least 350° C., and for a contact time of less than 0.4 second.

8. In a method of producing a plurality of aromatic compounds the step which comprises contacting a 1,1-di-xylylethane with an Attapulgus clay catalyst at a temperature which will cause said paraffin to decompose into a plurality of aromatic compounds in the presence of a catalyst and which is at least 350° C. and for a contact time of less than 0.4 second.

9. In a process of producing a plurality of aromatic compounds, the step which comprises contacting an asymmetric diarylethane with an Attapulgus clay catalyst at a temperature which will cause said paraffin to decompose into a plurality of aromatic compounds in the presence of a catalyst and which is at least 350° C., and for a contact time of less than 0.4 second, said diarylethane having at least one aryl group substituted with an alkyl group.

10. In a process of producing a plurality of aromatic compounds, the step which comprises contacting an asymmetric diarylethane with an Attapulgus clay catalyst at a temperature which will cause said paraffin to decompose into a plurality of aromatic compounds in the presence of a catalyst and which is at least 350° C. and for a contact time of less than 0.4 second, said diarylethane having at least one aryl group substituted with a hydroxyl group.

11. In a process of producing a plurality of aromatic compounds, the step which comprises contacting an asymmetric diarylethane with an Attapulgus clay catalyst at a temperature which will cause said paraffin to decompose into a plurality of aromatic compounds in the presence of a catalyst and which is at least 350° C., and for a contact time of less than 0.4 second, said diarylethane having at least one aryl group substituted with an alkyl group and a hydroxyl group.

KENNETH W. SAUNDERS.

REFERENCES CITED

The following references are of record in the file of this patent:

UNITED STATES PATENTS

| Number | Name | Date |
|---|---|---|
| 2,373,982 | Sturrock et al. | Apr. 17, 1945 |
| 2,363,243 | Harvey Jr. | Nov. 21, 1944 |
| 2,340,934 | Connolly | Feb. 8, 1944 |
| 2,282,327 | Dreisbach (A) | May 12, 1942 |
| 2,308,415 | Dreisbach (B) | Jan. 12, 1943 |

OTHER REFERENCES

Shelbley et al., Jour. Am. Chem. Soc., vol. 62, 840–1 (1940). (Patent Office Library.)

Certificate of Correction

Patent No. 2,422,171.  June 10, 1947.

KENNETH W. SAUNDERS

It is hereby certified that errors appear in the printed specification of the above numbered patent requiring correction as follows: Column 1, line 53, for "diotoyl-" read *ditolyl-*; column 4, line 20, for "daryl" read *diaryl*; and that the said Letters Patent should be read with these corrections therein that the same may conform to the record of the case in the Patent Office.

Signed and sealed this 29th day of July, A. D. 1947.

[SEAL]

LESLIE FRAZER,
*First Assistant Commissioner of Patents.*

350° C., passing said substance through Attapulgus clay with a contact time of less than 0.4 second.

7. In a method of producing a plurality of aromatic compounds the step which comprises contacting an asymmetric ditolylethane with an Attapulgus clay catalyst at a temperature which will cause said paraffin to decompose into a plurality of aromatic compounds in the presence of a catalyst and which is at least 350° C., and for a contact time of less than 0.4 second.

8. In a method of producing a plurality of aromatic compounds the step which comprises contacting a 1,1-di-xylylethane with an Attapulgus clay catalyst at a temperature which will cause said paraffin to decompose into a plurality of aromatic compounds in the presence of a catalyst and which is at least 350° C. and for a contact time of less than 0.4 second.

9. In a process of producing a plurality of aromatic compounds, the step which comprises contacting an asymmetric diarylethane with an Attapulgus clay catalyst at a temperature which will cause said paraffin to decompose into a plurality of aromatic compounds in the presence of a catalyst and which is at least 350° C., and for a contact time of less than 0.4 second, said diarylethane having at least one aryl group substituted with an alkyl group.

10. In a process of producing a plurality of aromatic compounds, the step which comprises contacting an asymmetric diarylethane with an Attapulgus clay catalyst at a temperature which will cause said paraffin to decompose into a plurality of aromatic compounds in the presence of a catalyst and which is at least 350° C. and for a contact time of less than 0.4 second, said diarylethane having at least one aryl group substituted with a hydroxyl group.

11. In a process of producing a plurality of aromatic compounds, the step which comprises contacting an asymmetric diarylethane with an Attapulgus clay catalyst at a temperature which will cause said paraffin to decompose into a plurality of aromatic compounds in the presence of a catalyst and which is at least 350° C., and for a contact time of less than 0.4 second, said diarylethane having at least one aryl group substituted with an alkyl group and a hydroxyl group.

KENNETH W. SAUNDERS.

REFERENCES CITED

The following references are of record in the file of this patent:

UNITED STATES PATENTS

| Number | Name | Date |
|---|---|---|
| 2,373,982 | Sturrock et al. | Apr. 17, 1945 |
| 2,363,243 | Harvey Jr. | Nov. 21, 1944 |
| 2,340,934 | Connolly | Feb. 8, 1944 |
| 2,282,327 | Dreisbach (A) | May 12, 1942 |
| 2,308,415 | Dreisbach (B) | Jan. 12, 1943 |

OTHER REFERENCES

Shelbley et al., Jour. Am. Chem. Soc., vol. 62, 840–1 (1940). (Patent Office Library.)

---

Certificate of Correction

Patent No. 2,422,171.　　　　　　　　　　　　　　　June 10, 1947.

KENNETH W. SAUNDERS

It is hereby certified that errors appear in the printed specification of the above numbered patent requiring correction as follows: Column 1, line 53, for "diotoyl-" read *ditolyl-*; column 4, line 20, for "daryl" read *diaryl*; and that the said Letters Patent should be read with these corrections therein that the same may conform to the record of the case in the Patent Office.

Signed and sealed this 29th day of July, A. D. 1947.

[SEAL]

LESLIE FRAZER,
*First Assistant Commissioner of Patents.*